United States Patent Office 3,833,671
Patented Sept. 3, 1974

3,833,671
PROCESS FOR THE PREPARATION OF ISOBORNYLPHENOL
Jean Mardiguian and Pierre Fournier, Paris, France, assignors to Societe a Responsabilitee Limitee dite: Mar-Pha Societe d'Etudes et d'Exploitation de Marques, Paris, France
No Drawing. Filed July 1, 1970, Ser. No. 51,664
Claims priority, application Great Britain, July 4, 1969, 33,959/69
Int. Cl. C07c 37/00
U.S. Cl. 260—619 D
14 Claims

ABSTRACT OF THE DISCLOSURE

A process for the preparation of isobornylphenols of the formula:

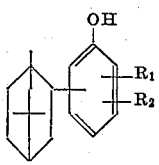

I in which $R_1$ and $R_2$ may be identical or different and each represent a hydrogen or halogen atom or a straight or branched chain lower alkyl group, containing not more than 4 carbon atoms, provided that $R_1$ and $R_2$ are not simultaneously hydrogen atoms, which process comprises (a) condensing camphene with a methyl ether of a phenol of the formula:

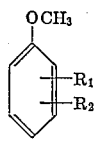

II to yield a methyl ether of an isobornylphenol of formula:

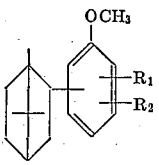

III and (b) demethylating the intermediate compound of formula III to give the isobornylphenol of formula I.

---

This invention relates to isobornyl-phenols and their preparation.

The present invention provides a process for the preparation of isobornylphenols of the formula:

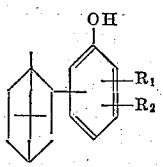

I in which $R_1$ and $R_2$ may be identical or different and each represent a hydrogen or halogen atom or a straight or branched chain lower alkyl group, containing not more than 4 carbon atoms, provided that $R_1$ and $R_2$ are not simultaneously hydrogen atoms, which process comprises (a) condensing camphene with a methyl ether of a phenol of the formula:

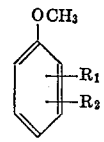

II in which $R_1$ and $R_2$ are as defined above, preferably at a temperature below the melting point of the camphene, in the presence of stannic chloride as catalyst, and preferably also in the presence of an excess of the said ether of formula as the reaction solvent, to yield a methyl ether of an isobornylphenol of formula:

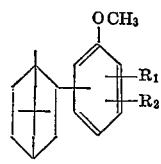

III in which $R_1$ and $R_2$ are as defined above, and (b) demethylating the intermediate compound of formula III to give the isobornylphenol of formula I.

The invention is particularly advantageous as applied to the preparation of 6-isobornyl-3,4-xylenol which is well known for its bacteriostatic properties by: (a) condensing camphene with 3,4-dimethylanisole at a temperature below the melting point of the camphene, preferably at ordinary temperature or at a lower temperature, more particularly at 0° C., in the presence of stannic chloride as catalyst and preferably in the presence of an excess of 3,4-dimethylanisole as the reaction solvent, for a period of time of 24 to 48 hours, to form the methyl ether of 6-isobornyl-3,4-xylenol, and (b) demethylating the said methyl ether to give 6-isobornyl-3,4-xylenol, for example by reaction with hydrobromic acid in an anhydrous acetic acid medium at a temperature above 50° C.

The methyl ether of 6-isobornyl-3,4-xylenol is a new chemical compound and as such within the scope of the invention.

The process of the invention has numerous advantages over the previously used process according to which camphene is directly condensed with a phenol in the presence of a Friedel-Crafts catalyst. In fact, since the two reagents are normally solid at ambient temperature the condensation must in the previous process be carried out at a sufficiently high temperature for the said reagents to be in the molten state.

Now under these conditions a considerable quantity of isomers and undesirable by-products forms in addition to the desired product. Furthermore the condensation of the camphene with the phenol is incomplete. Thus not only is the yield of desired product low, but the separation and purification of the said product furthermore prove difficult, involved and costly.

Unlike the prior art, if camphere is condensed according to the present invention with a methyl ether of a phenol, which is normally liquid at ambient temperature and can be used also as reaction solvent, the condensation can be carried out at a lower temperature, and the formation of isomers and by-products is limited and the complete condensation of the camphene favoured. Under the conditions of the invention a crude product is obtained which contains at least 92% of the desired intermediate product. The intermediate product can be obtained in the pure state, in excellent yield, by crystallisation. However the quality of the crude product is sufficiently good for it to be usable as such in the demethylation stage without further purification.

Furthermore, the demethylation reaction with hydrobromic acid in anhydrous acetic acid at a moderate temperature yields the desired isobornylphenol in excellent yield together with a small amount of isobornylalkylphenol acetate which can easily be hydrolysed in an acid medium to give the isobornylphenol.

The invention is illustrated by the following non-limiting Example:

EXAMPLE 54.4 g. of 3,4-dimethylanisole and 27.2 g. of camphene (m.p.=47° C.) are introduced into a 500 ml. flask cooled with an ice bath. The mixture is stirred with an electromagnetic stirrer. When the camphene has dissolved, 6.4 ml. of stannic chloride are added dropwise by a dropping funnel with stirring and cooling. When the addition is complete, the stoppered flask is placed in a refrigerator at 0° C. for 40 hours. After it has warmed up to ambient temperature, the reaction mixture is taken up in 300 ml. of petroleum ether and 50 ml. of water are added thereto. The decanted organic layer is washed several times with 15% strength potassium hydroxide solution (a total of 600 ml.) and then with water until neutral (a total of 800 ml.).

The organic phase is dried over sodium sulphate. The petroleum ether is evaporated, and the excess 3,4-dimethylanisole is then distilled off under a high vacuum. 25.1 g. of 3,4-dimethylanisole are recovered and a white residue, weighing 53 g. (a yield of 97.5% of theory calculated on the camphene) and containing 92% of the methyl ether of 6-isobornyl-3,4-xylenol, is obtained. Crystallisation from methanol yields 39 g. of the methyl ether of 6-isobornyl-3,4-xylenol of 99.1% purity, m.p. 88° C. Yield=72%. Recrystallisation yields a very pure product melting at 90° C.

The methyl ether of 6-isobornyl-3,4-xylenol is soluble in ether, petroleum ether, acetone, benzene and chloroform and is insoluble in methanol and ethanol. Its infrared spectrum shows characteristic absorption bands at: 6.2, 6.7, 6.67, 6.87, 7.4, 8 and 11.2$\mu$.

Percentage Analysis: Calculated for $C_{19}H_{28}O$ (percent): O, 83.76; H, 10.35; O, 5.89. Found (percent): O, 83.70; H, 10.42; O, 5.08.

10 g. of the methyl ether of 6-isobornyl-3,4-xylenol obtained previously (m.p. 88° C.) are introduced into a 250 ml. flask equipped with a straight condenser into which dips a nitrogen inlet tube and a system of absorption tubes. 125 ml. of a 35% strength solution of HBr in anhydrous acetic acid is added thereto. The apparatus is degassed by a slight stream of nitrogen and the flask is then placed in a water bath at 40° C. The temperature is gradually raised to 60° C. with stirring. After one hour and 15 minutes a red solution is obtained which is kept at 60° C. for 6 hours and 30 minutes. At the end of this time demethylation is practically complete. 93% of 6-isobornyl-3,4-xylenol and 7% of 6-isobornyl-3,4 xylenol acetate form. The latter is hydrolysed as follows: The mixture is evaporated in vacuo and the residue taken up in 125 ml. of 95% ethyl alcohol and 10 ml. of concentrated hydrochloric acid. This mixture is refluxed for 3 hours and then evaporated to dryness in vacuo. The residue is taken up in 100 ml. of petroleum ether and the solution washed with 50 ml. of 3% potassium hydroxide solution and then with water until neutral. The solution in petroleum ether is decolourised by passing it over a column of Florisil (50 g. in a column of 28 mm. diameter). The column is eluted with 300 ml. of toluene and the solvent is evaporated.

9.25 g. of a product which, after grinding takes the form of a creamy-white powder are obtained, m.p. 89–92° C. The yield is 98%.

After crystallisation from 200 ml. of a mixture of water-acetic acid containing 12.5% of water (by volume), washing the crystals with 10 ml. of 40% strength ethyl alcohol and drying in an oven at 60° C., 6.7 g. of 6-isobornyl-3,4-xylenol of 99.1% purity are obtained, m.p. 94.5° C., yield 70%. A fresh crystallisation yields 5.84 g. of very pure 6 isobornyl-3,4-xylenol, m.p. 95.5° C. A crude product containing 98% of 6-isobornyl-3,4-xylenol melting at 90° C. is recovered in 18% yield from the crystallisation mother liquors and can be purified.

What is claimed is:

1. A process for the preparation of an isobornylphenol of the formula:

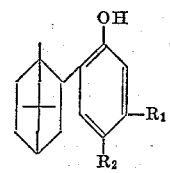

in which $R_1$ is a straight or branched chain lower alkyl group containing not more than 4 carbon atoms, $R_2$ is a hydrogen atom or a straight or branched chain lower alkyl group containing not more than 4 carbon atoms, which process comprises (a) condensing camphene with a methyl ether or a phenol of the formula:

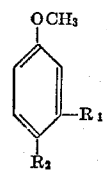

in which $R_1$ and $R_2$ are as defined above, at a temperature not above ambient temperature, in the presence of stannic chloride as catalyst, to yield a methyl ether of isobornylphenol of the formula:

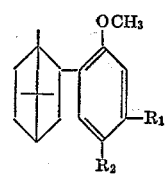

in which $R_1$ and $R_2$ are as defined above, and (b) demethylating the intermediate compound of formula III to give the isobornyl-phenol of formula I.

2. A process for the preparation of 6-isobornyl-3,4-xylenol which comprises (a) condensing camphene with 3,4-dimethylanisole not above ambient temperature, in the presence of stannic chloride as catalyst and in the presence of an excess of 3,4-dimethylanisole as the reaction solvent, for a period of time of 24 to 48 hours, to form the methyl ether of 6-isobornyl-3,4-xylenol, and (b) demethylating the said methyl ether to give 6-isobornyl-3,4-xylenol, by reaction with hydrobromic acid in any anhydrous acetic acid medium at a temperature above 50° C.

3. The process of claim 1 wherein the reaction temperature is 0° C.

4. The process of claim 1 wherein the reaction temperature is from ambient temperature to about 0° C.

5. The process of claim 1 wherein the condensation is carried in the presence of an excess of the methyl ether of formula II as the reaction solvent.

6. The process of claim 1 wherein the methyl ether is 3,4-dimethylanisole.

7. The process of claim 1 which comprises dissolving the camphene in the methyl ether of formula II prior to condensation thereof.

8. The process of claim 1 wherein a solution of the camphene and methyl ether of formula II is condensed, at the defined temperature.

9. The process of claim 6 wherein the methyl ether of formula III which is obtained is the methyl ether 6-isobornyl-3,4-xylenol.

10. The process of claim 1 which comprises separating the reaction product from the reaction mixture.

11. The process of claim 1 which comprises separating the methyl ether of formula III in a yield of at least 92% from the condensation reaction product.

12. The process of claim 10 which comprises separating the isobornyl phenol of formula I in a yield of at least 92%.

13. The process of claim 1 wherein there is separated be crystallization a methyl ether of isobornylphenol of formula III from excess reactant of formula I.

14. The process of claim 1 wherein the condensation is carried out from a solution of camphene in 3,4-dimethylanisole and there is produced the methyl ether of 6-isobornyl-3,4-xylenol.

References Cited

UNITED STATES PATENTS

| 2,320,846 | 6/1943 | Borglin | 260—612 R |

FOREIGN PATENTS

| 535,114 | 1/1957 | Canada | 260—619 D |
| 1,355,165 | 2/1964 | France | 260—619 D |

OTHER REFERENCES

Kitchen, Jour. Amer. Chem. Soc., vol. 70 (1948), 3608–3610.

Erman et al., Jour. Org. Chem., vol. 27 (1962), 1526–1535.

English et al., Jour. Amer. Chem. Soc., vol. 71 (1949), 3310–3313.

Kryuchkova et al., Chem. Abs., vol. 55 (1961), 22, 202–22, 203.

BERNARD HELFIN, Primary Examiner

U.S. Cl. X.R.

260—612 R